(12) United States Patent
Wihamre (10) Patent No.: US 11,201,684 B2
(45) Date of Patent: Dec. 14, 2021

(54) TRANSMISSION AND RECEPTION OF TIMESTAMP INFORMATION

(71) Applicant: Telefonaktiebolaget LM Ericsson (publ), Stockholm (SE)

(72) Inventor: Tume Wihamre, Ekerö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/315,101

(22) PCT Filed: Jul. 6, 2016

(86) PCT No.: PCT/SE2016/050693
§ 371 (c)(1),
(2) Date: Jan. 3, 2019

(87) PCT Pub. No.: WO2018/009107
PCT Pub. Date: Jan. 11, 2018

(65) Prior Publication Data
US 2019/0253167 A1 Aug. 15, 2019

(51) Int. Cl.
*H04L 12/26* (2006.01)
*H04L 29/06* (2006.01)
(Continued)

(52) U.S. Cl.
CPC .......... *H04J 3/067* (2013.01); *H04J 3/0667* (2013.01); *H04L 9/3242* (2013.01);
(Continued)

(58) Field of Classification Search
None
See application file for complete search history.

(56) References Cited

U.S. PATENT DOCUMENTS 9,077,619 B2 * 7/2015 Edsall ................. H04L 43/0882
9,357,516 B2 * 5/2016 Irvine ................... H04J 3/0658
(Continued)

FOREIGN PATENT DOCUMENTS

CN 101080889 A 11/2007
CN 101827098 A 9/2010
(Continued)

OTHER PUBLICATIONS

Extended European Search Report dated Jun. 28, 2019 issued in European Patent Application No. 16908269.0. (6 pages).
(Continued)

*Primary Examiner* — Sithu Ko
(74) *Attorney, Agent, or Firm* — Rothwell, Figg, Ernst & Manbeck, P.C.

(57) ABSTRACT

There is provided mechanisms for transmission of timestamp information. A method is performed by a transmitter device. The method comprises obtaining a first timestamp. The method comprises inserting a protected representation of the first timestamp in a payload field of a message. The message is a precision time protocol message. The method comprises timestamping the message by inserting a second timestamp in a timestamp field of the message. The method comprises transmitting the timestamped message to a receiver device. There is also provided mechanisms for reception of protected timestamp information. A method is performed by a receiving device.

17 Claims, 6 Drawing Sheets

(51) Int. Cl.
*H04J 3/06* (2006.01)
*H04L 9/32* (2006.01)
*H04W 56/00* (2009.01)

(52) U.S. Cl.
CPC ............ *H04L 9/3297* (2013.01); *H04L 69/28* (2013.01); *H04W 56/00* (2013.01)

(56) References Cited

U.S. PATENT DOCUMENTS

| | | | | |
|---|---|---|---|---|
| 9,614,819 | B2* | 4/2017 | Mizrahi | H04L 63/12 |
| 9,647,784 | B2* | 5/2017 | Ruffini | H04J 3/0658 |
| 9,929,928 | B1* | 3/2018 | Dekoos | H04L 43/106 |
| 10,148,796 | B2* | 12/2018 | Wang | H04L 43/106 |
| 10,694,260 | B2* | 6/2020 | Oh | H04N 21/6125 |
| 2008/0260151 | A1 | 10/2008 | Fluhrer et al. | |
| 2010/0049964 | A1* | 2/2010 | Kondapalli | H04L 69/28 |
| | | | | 713/150 |
| 2013/0114601 | A1* | 5/2013 | Branscomb | H04L 45/00 |
| | | | | 370/392 |
| 2013/0136145 | A1* | 5/2013 | Bi | H04L 69/22 |
| | | | | 370/475 |
| 2013/0170507 | A1* | 7/2013 | Hsueh | H04J 3/0667 |
| | | | | 370/503 |
| 2014/0098684 | A1* | 4/2014 | Diab | H04L 43/087 |
| | | | | 370/252 |
| 2014/0269778 | A1* | 9/2014 | Yang | H04J 3/0697 |
| | | | | 370/503 |
| 2014/0293825 | A1* | 10/2014 | Kalkunte | H04L 43/106 |
| | | | | 370/253 |
| 2015/0139251 | A1* | 5/2015 | Tzeng | H04J 3/0697 |
| | | | | 370/503 |
| 2016/0345179 | A1* | 11/2016 | Chen | H04J 3/0661 |

FOREIGN PATENT DOCUMENTS

| | | |
|---|---|---|
| CN | 102347831 A | 2/2012 |
| CN | 103138887 A | 6/2013 |
| CN | 103581205 A | 2/2014 |
| EP | 2 395 404 A1 | 12/2011 |
| EP | 2600585 A1 | 6/2013 |
| WO | 2016184981 A2 | 11/2016 |

OTHER PUBLICATIONS

International Search Report and Written Opinion dated Mar. 13, 2017 issued in International Application No. PCT/SE2016/050693. (11 pages).

Cui, Y. et al., "Practical solutions for encrypted synchronization protocol (Internet Draft)"; draft-cui-tictoc-encrypted-synchronization-00; Feb. 29, 2012. (10 pages).

"IEEE Standard for a Precision Clock Synchronization Protocol for Networked Measurement and Control Systems" IEEE—IEEE Instrumentation and Measurement Society; IEEE Std 1588™—2008; Jul. 24, 2008. (289 pages).

Treytl, A. et al., "Secure Tunneling of High-Precision Clock Synchronization Protocols and other Time-Stamped Data"; May 2010. (8 pages).

Mizrahi, T., "Time Synchronization Security using IPsec and MACsec"; MARVELL; Israel Networking Seminar; May 2012. (18 pages).

* cited by examiner

TRANSMISSION AND RECEPTION OF TIMESTAMP INFORMATION

CROSS REFERENCE TO RELATED APPLICATION(S)

This application is a 35 U.S.C. § 371 National Stage of International Patent Application No. PCT/SE2016/050693, filed Jul. 6, 2016, designating the United States.

TECHNICAL FIELD

Embodiments presented herein relate to a method, a transmitter device, a computer program, and a computer program product for transmission of timestamp information. Embodiments presented herein further relate to a method, a receiver device, a computer program, and a computer program product for reception of protected timestamp information.

BACKGROUND

In communications systems, there may be a challenge to obtain good performance for a given communications protocol, its parameters and the physical environment in which the communications systems are deployed.

For example, one parameter in providing good performance for a given communications protocol in a communications system is the ability to use precise time information. The Precision Time Protocol (PTP) is a protocol used to synchronize clocks throughout a computer network. On a local area network, it can achieve clock accuracy in the sub-microsecond range.

Precise time information can be provided by a so-called timestamp. In general terms, a timestamp is a sequence of characters or encoded information identifying when a certain event occurred, usually giving date and time of day, sometimes accurate to a small fraction of a second. For a timestamp recorded by a computer the timestamp represents the time at which the event is recorded by the computer, not the time of the event itself.

One purpose of the IEEE 1588 PTP (where IEEE is short for Institute of Electrical and Electronics Engineers) is to synchronize the time between different nodes on an Ethernet network.

It could be of benefit to protect timestamped messages in order to ensure that the timestamp in a given message has not been tampered with. The IEEE 1588 PTP does not by itself specify such security aspects. In this respect, in terms of the Open Systems Interconnection (OSI) model for protocol layers, in order to achieve a timestamp with high precision (i.e., with a difference between recording to the timestamp and occurrence of the event represented by the timestamp being as small as possible) the timestamp should be added at the medium access control (MAC) part at protocol layer 2 (L2). However, this will compromise any protection of the thus timestamped message if security is added to it before the timestamp. Further, adding protection to the message after the timestamp has been provided will compromise the precision of the timestamp. Further still, adding protection to the message after the timestamp has been provided will add latency.

Hence, there is still a need for an improved way of transmitting and receiving timestamps.

SUMMARY

An object of embodiments herein is to provide efficient transmission and reception of timestamps with respect to latency, security and/or precision.

According to a first aspect there is presented a method for transmission of timestamp information. The method is performed by a transmitter device. The method comprises obtaining a first timestamp. The method comprises inserting a protected representation of the first timestamp in a payload field of a message. The message is a precision time protocol (PTP) message. The method comprises timestamping the message by inserting a second timestamp in a timestamp field of the message. The method comprises transmitting the timestamped message to a receiver device.

According to a second aspect there is presented a transmitter device for transmission of timestamp information. The transmitter device comprises processing circuitry. The processing circuitry is configured to cause the transmitter device to obtain a first timestamp. The processing circuitry is configured to cause the transmitter device to insert a protected representation of the first timestamp in a payload field of a message. The message is a PTP message. The processing circuitry is configured to cause the transmitter device to timestamp the message by inserting a second timestamp in a timestamp field of the message. The processing circuitry is configured to cause the transmitter device to transmit the timestamped message to a receiver device.

According to a third aspect there is presented a transmitter device for transmission of timestamp information. The transmitter device comprises processing circuitry and a computer program product. The computer program product stores instructions that, when executed by the processing circuitry, causes the transmitter device to perform operations, or steps. The operations, or steps, cause the transmitter device to obtain a first timestamp. The operations, or steps, cause the transmitter device to insert a protected representation of the first timestamp in a payload field of a message. The message is a PTP message. The operations, or steps, cause the transmitter device to timestamp the message by inserting a second timestamp in a timestamp field of the message. The operations, or steps, cause the transmitter device to transmit the timestamped message to a receiver device.

According to a fourth aspect there is presented a transmitter device for transmission of timestamp information. The transmitter device comprises an obtain module configured to obtain a first timestamp. The transmitter device comprises an insert module configured to insert a protected representation of the first timestamp in a payload field of a message. The message is a PTP message. The transmitter device comprises a timestamp module configured to timestamp the message by inserting a second timestamp in a timestamp field of the message. The transmitter device comprises a transmit module configured to transmit the timestamped message to a receiver device.

According to a fifth aspect there is presented a computer program for transmission of timestamp information. The computer program comprises computer code which, when run on processing circuitry of a transmitter device, causes the transmitter device to perform operations, or steps. The operations, or steps, cause the transmitter device to obtain a first timestamp. The operations, or steps, cause the transmitter device to insert a protected representation of the first timestamp in a payload field of a message. The message is a PTP message. The operations, or steps, cause the transmitter device to timestamp the message by inserting a second timestamp in a timestamp field of the message. The operations, or steps, cause the transmitter device to transmit the timestamped message to a receiver device.

According to a sixth aspect there is presented a method for reception of timestamp information. The method is performed by a receiver device. The method comprises receiving a timestamped message. The timestamped message is a PTP message and comprises a payload field comprising a protected representation of a first timestamp and a timestamp field comprising a second timestamp. The method comprises extracting the first timestamp from the protected representation. The method comprises accepting the second timestamp as timestamp of the timestamped message only when the second timestamp is distanced at most a threshold time value from the first timestamp.

According to a seventh aspect there is presented a receiver device for reception of timestamp information. The receiver device comprises processing circuitry. The processing circuitry is configured to cause the receiver device to receive a timestamped message. The timestamped message is a PTP message and comprises a payload field comprising a protected representation of a first timestamp and a timestamp field comprising a second timestamp. The processing circuitry is configured to cause the receiver device to extract the first timestamp from the protected representation. The processing circuitry is configured to cause the receiver device to accept the second timestamp as timestamp of the timestamped message only when the second timestamp is distanced at most a threshold time value from the first timestamp.

According to an eighth aspect there is presented a receiver device for reception of timestamp information. The receiver device comprises processing circuitry and a computer program product. The computer program product stores instructions that, when executed by the processing circuitry, causes the receiver device to perform operations, or steps. The operations, or steps, cause the receiver device to receive a timestamped message. The timestamped message is a PTP message and comprises a payload field comprising a protected representation of a first timestamp and a timestamp field comprising a second timestamp. The operations, or steps, cause the receiver device to extract the first timestamp from the protected representation. The operations, or steps, cause the receiver device to accept the second timestamp as timestamp of the timestamped message only when the second timestamp is distanced at most a threshold time value from the first timestamp.

According to a ninth aspect there is presented a receiver device for reception of timestamp information. The receiver device comprises a receive module configured to receive a timestamped message. The timestamped message is a PTP message and comprises a payload field comprising a protected representation of a first timestamp and a timestamp field comprising a second timestamp. The receiver device comprises an extract module configured to extract the first timestamp from the protected representation. The receiver device comprises an accept module configured to accept the second timestamp as timestamp of the timestamped message only when the second timestamp is distanced at most a threshold time value from the first timestamp.

According to a tenth aspect there is presented a computer program for reception of timestamp information. The computer program comprises computer code which, when run on processing circuitry of a receiver device, causes the receiver device to perform operations, or steps. The operations, or steps, cause the receiver device to receive a timestamped message. The timestamped message is a PTP message and comprises a payload field comprising a protected representation of a first timestamp and a timestamp field comprising a second timestamp. The operations, or steps, cause the receiver device to extract the first timestamp from the protected representation. The operations, or steps, cause the receiver device to accept the second timestamp as timestamp of the timestamped message only when the second timestamp is distanced at most a threshold time value from the first timestamp.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

According to a twelfth aspect there is presented a communications device The communications device comprises a transmitter device according to the second, third or fourth aspect and/or a receiver device according to the seventh, eighth or ninth aspect.

Advantageously these methods, these transmitter devices, these receiver devices, this communications device, and these computer programs provide efficient handling of timestamped information.

Advantageously these methods, these transmitter devices, these receiver devices, this communications device, and these computer programs provide efficient protection of timestamped information.

Advantageously these methods, these transmitter devices, these receiver devices, this communications device, and these computer programs enable the receiver device to determine whether or not the timestamp of the message (i.e., the second timestamp) has been tampered with. Advantageously these methods, these transmitter devices, these receiver devices, this communications device, and these computer programs enable the transmitter device to transmit such a timestamp in an efficient manner.

Taking the method according to the first aspect as an example, the method may comprise the steps of obtaining a time difference between a previous second timestamp of a previous timestamped message and a previous first timestamp of the previous timestamped message, and wherein the representation of the first timestamp is adjusted based on the time difference. The protected representation of the first timestamp may be a fixed time difference to the second timestamp.

The payload field may comprise a protected representation of at least one previous second timestamp of a timestamp field of at least one previously transmitted timestamped message.

Each of said at least one previous second timestamp may be weighted with a respective weight factor.

The timestamped message may be transmitted during a transmission interval, and the payload field may then further comprise an indication that the timestamped message is a first occurring timestamped message of the transmission interval.

The method according to the first aspect may further comprise the obtaining of an indication from the receiver device to include the protected representation of the at least one previous second timestamp in the payload field.

The method according to the first aspect may comprise the obtaining of an indication from the receiver device to stop including the protected representation of the at least one previous second timestamp in the payload field.

The method according to the first aspect may also comprise the step of protecting the first timestamp to obtain the protected representation of the first timestamp by at least one of integrity protecting and authentication protecting the first timestamp.

The method according to the first aspect may comprise the step of protecting the first timestamp to obtain the protected representation of the first timestamp by encrypting the first timestamp.

Protecting the first timestamp may comprise at least one of applying a cryptographic hash function to the first timestamp, subjecting the first timestamp to operations of Internet Protocol Security, IPsec, subjecting the first timestamp to operations of Media Access Control security, MACsec, and applying a keyed-hash message authentication code to the first timestamp.

Protecting the first timestamp may be performed at protocol layer 2, or protocol layer 3.

The second timestamp may be inserted in the message at protocol layer 1.

It is to be noted that any feature of the first, second, third, fourth, fifth, sixth seventh, eight, ninth, tenth, eleventh and twelfth aspects may be applied to any other aspect, wherever appropriate. Likewise, any advantage of the first aspect may equally apply to the second, third, fourth, fifth, sixth, seventh, eight, ninth, tenth, eleventh, and/or twelfth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
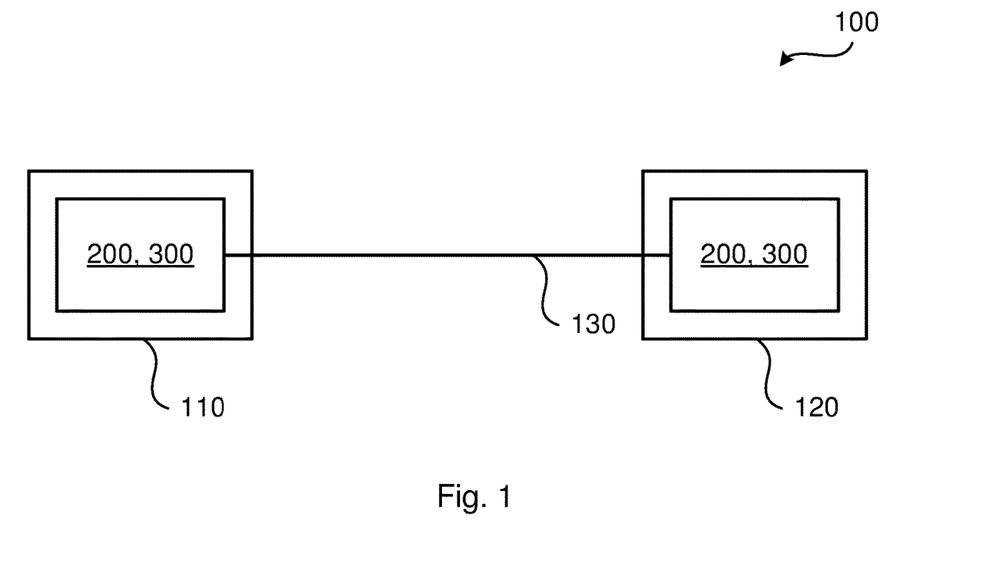
FIG. 1 is a schematic diagram illustrating a communications system according to embodiments.

FIG. 1 is a schematic diagram illustrating a communications system 100 where embodiments presented herein can be applied. The communications system 100 comprises a first communications device 110 and a second communications device 120.

There are different examples of communications devices 110, 120. A non-complete list includes stationary devices such as radio access network nodes, radio base stations, base transceiver stations, node Bs, evolved node Bs, access nodes, access points, and portable devices such as portable wireless devices, mobile stations, mobile phones, handsets, wireless local loop phones, user equipment (UE), smartphones, laptop computers, tablet computers, and network-equipped sensors. The communications device may also be a telematics unit embedded in or attachable to a vehicle, such as a car, truck, bus, boat, train, airplane and flying drone. The communication device may also for example be embedded in, or attachable to, a domestic appliance, such as in white goods, door locks, surveillance and alarm equipment and autonomous vacuum cleaners and grass cutters. The communication device may also be embedded in or attachable to telematics units for robots and 3D printers used for industrial purposes or for domestic support functions. Another example of where the communication device may be incorporated, or added to, is in public service equipment, such as street lamps, surveillance cameras, and entrance admittance equipment for public transport. The communications device described herein may in other words be, or be implemented in, any equipment which is able to utilize the connectivity to a communications network. Further examples of such communications devices are equipment used in healthcare and in payment terminals, e.g. payment terminals for credit cards.

The first communications device 110 and the second communications device 120 are separated by a communications channel 130. The communications channel 130 can be wired or wireless. Examples of wired communications channels 130 include, but are not limited to, optical fibers, coaxial cables, High-Definition Multimedia Interface (HDMI) cables, twisted pair cables, Ethernet cables, and the like. Examples of wireless communications channels 130 include, but are not limited to, radio channels, wireless optical channels, and the like, and may be based on any standard such as the $3^{rd}$ Generation Partnership Project (3GPP) family of communications standards, the Institute of Electrical and Electronics Engineers (IEEE) family of communications standards, and the Infrared Data Association (IrDA) family of communications standards.

The first communications device 110 and the second communications device 120 are assumed to communicate with each other at least by transmitting PTP messages between them. In order to do so each communications device 110, 120 comprises a transmitter device 200 and a receiver device 300. It could be so that one of the communications devices 110, 120 only comprises a transmitter device 200 (and hence no receiver device 300) and that the other of the communications devices 110, 120 only comprises a receiver device 300 (and hence no transmitter device 200).

As noted above, there is need for an improved way of transmitting and receiving timestamps.

The embodiments disclosed herein thus relate to mechanisms for transmission and reception of protected timestamp information. In order to obtain mechanisms for transmission of protected timestamp information there is provided a transmitter device 200, a method performed by the transmitter device 200, a computer program product comprising code, for example in the form of a computer program, that when run on processing circuitry of the transmitter device 200, causes the transmitter device 200 to perform the method. In order to obtain mechanisms for reception of protected timestamp information there is provided a receiver device 300, a method performed by the receiver device 300, and a computer program product comprising code, for example in the form of a computer program, that when run on processing circuitry of the receiver device 300, causes the receiver device 300 to perform the method.

Figure 2:
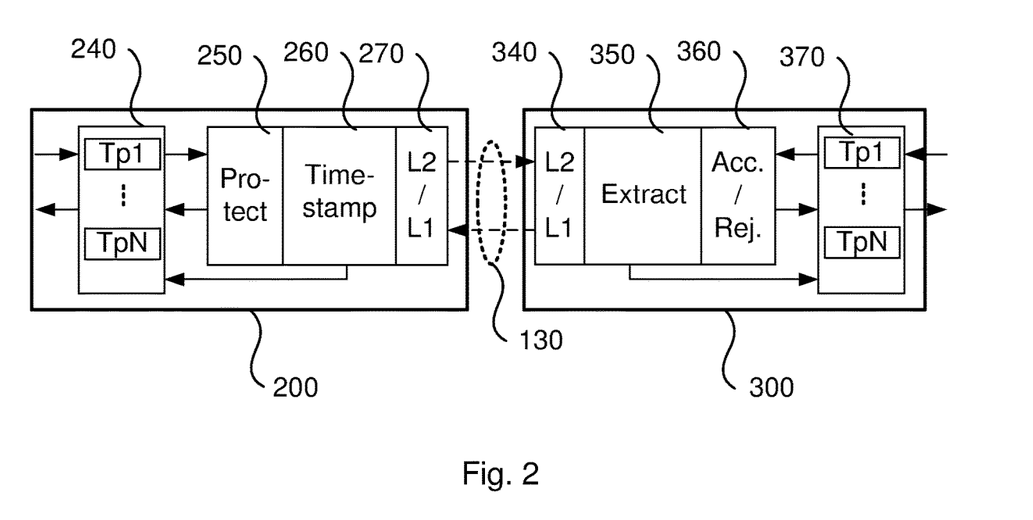
FIG. 2 is a schematic diagram illustrating a transmitter device and a receiver device according to an embodiment.

FIG. 2 illustrates the transmitter device 200 and the receiver device 300 in more detail. The transmitter device 200 comprises a bank 240 configured to hold one or more previously transmitted timestamps Tp1, . . . , TpN, a protect module 250 configured to protect timestamps, a timestamp module 260 configured to timestamp messages, and an L1/L2 module 270 configured to transmit messages. The bank may be embodied as e.g. a Random Access Memory, a Flash memory, or other type of non-volatile memory. Further details of the transmitter device 200 and its functionality will be provided below. The transmitter device 200 comprises an L1/L2 module 340 configured to receive messages, an extract module 350 configured to extract timestamps from protected representations of timestamps, an accept/reject module 360 configured to selectively accept or reject timestamps, and a bank 370 configured to hold one or more previously received timestamps Tp1, . . . , TpN. Further details of the receiver device 300 and its functionality will be provided below.

Figure 3:
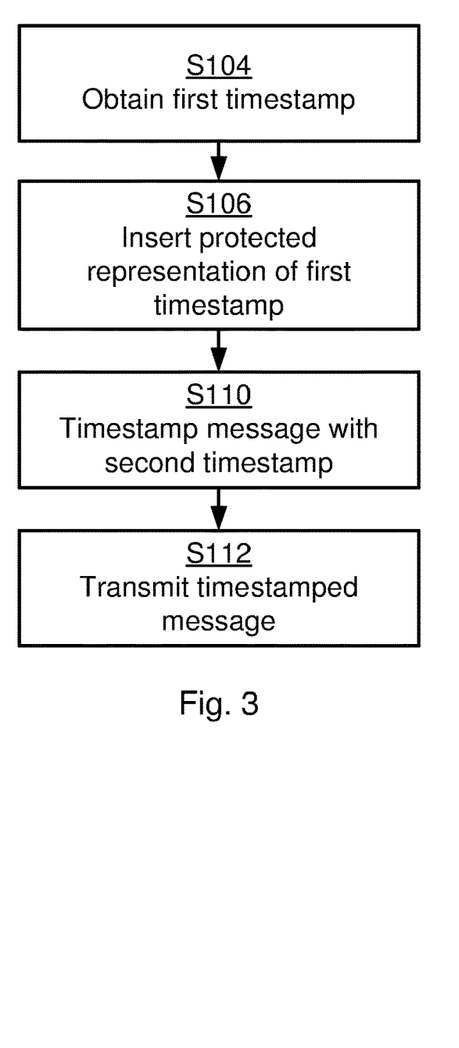
FIGS. 3, 4, 5, and 6 are flowcharts of methods according to embodiments.
Figure 4:
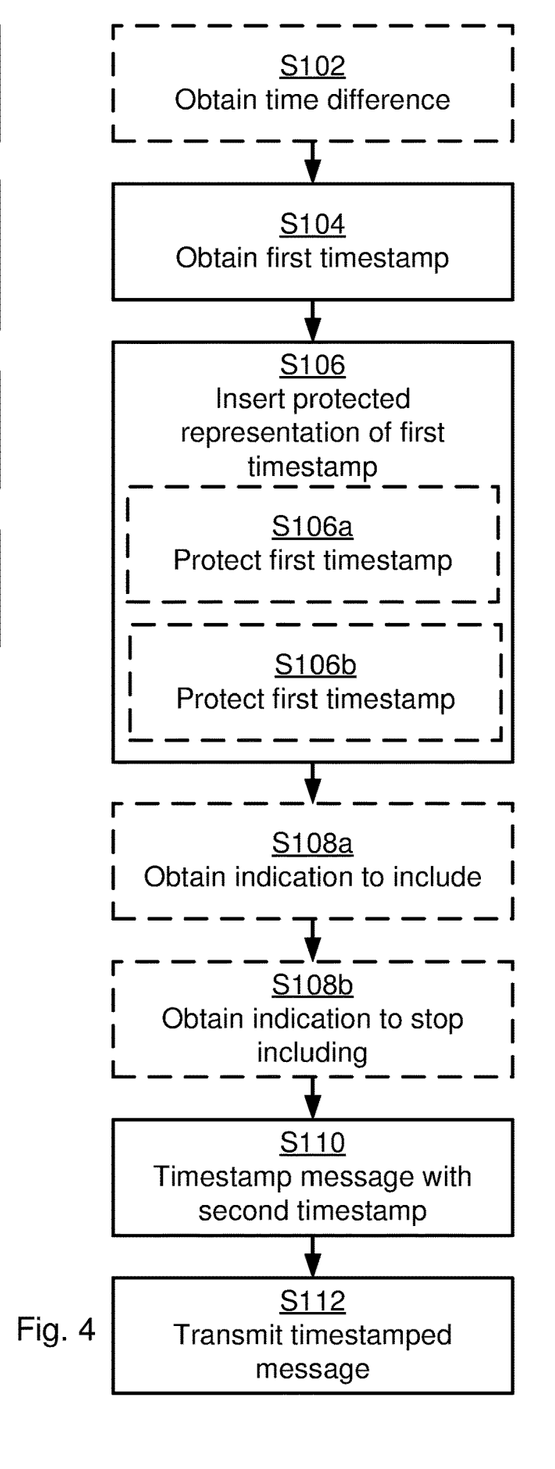
Figures 5, 6:
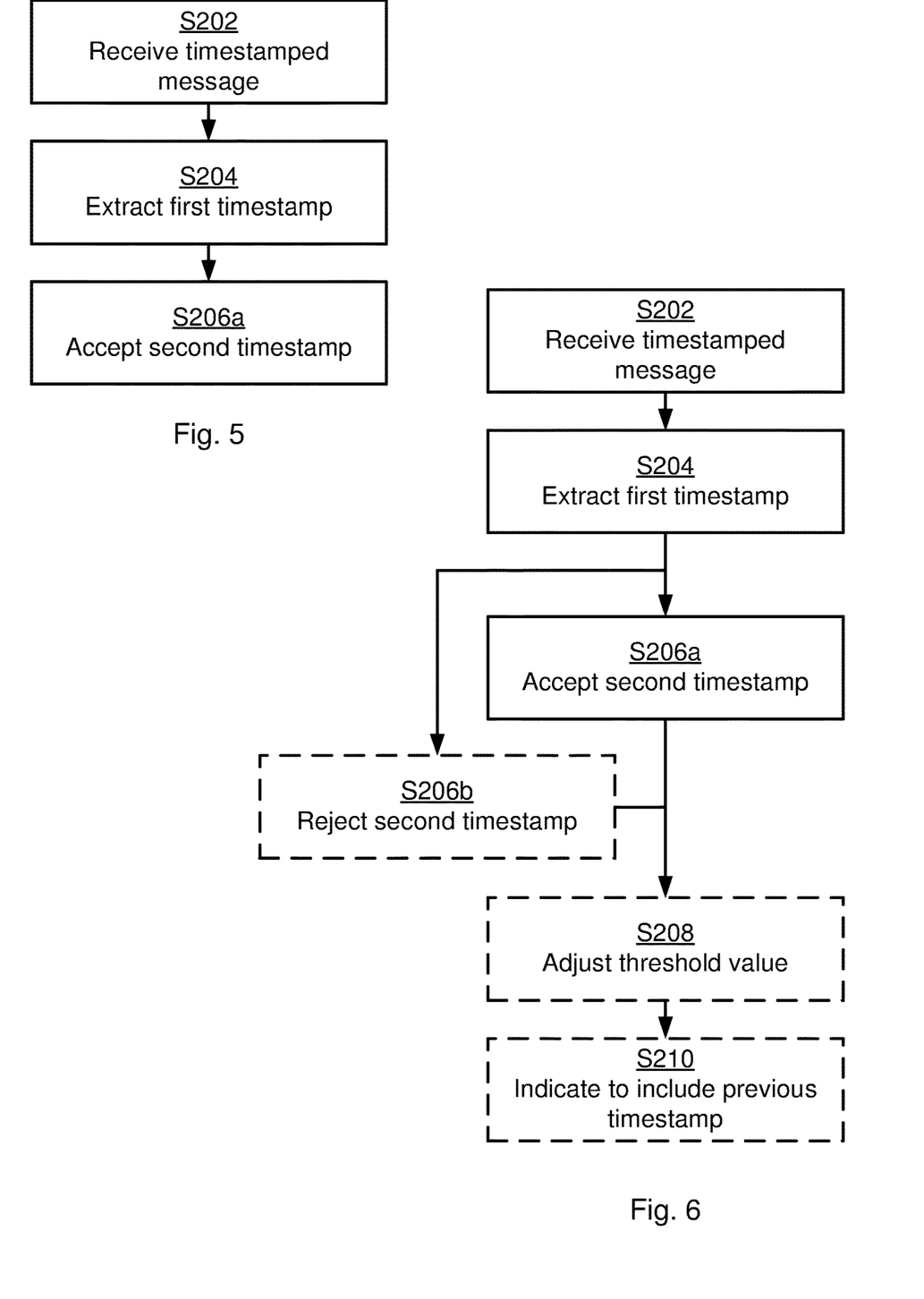

FIGS. 3 and 4 are flow charts illustrating embodiments of methods for transmitting protected timestamp information as performed by the transmitter device 200. FIGS. 5 and 6 are flow charts illustrating embodiments of methods for receiving protected timestamp information as performed by the receiver device 300. The methods are advantageously provided as computer programs 1620a, 1620b.

Reference is now made to FIG. 3 illustrating a method for transmitting protected timestamp information as performed by the transmitter device 200 according to an embodiment.

S104: The transmitter device 200 obtains a first timestamp. In this respect the first timestamp may be generated by the transmitter device 200 itself or be received from another device or unit, such as a dedicated timestamp unit or device, that generates the first timestamp. How to generate a timestamp is as such known in the art and a detailed description thereof is therefore omitted.

S106: The transmitter device 200 inserts a protected representation of the first timestamp in a payload field of a message. Different ways according to which the first timestamp could be protected will be provided below. The message is a PTP message.

S110: The transmitter device 200 timestamps the message by inserting a second timestamp in a timestamp field of the message. This second timestamp may be generated by the transmitter device 200 itself or be received from another device or unit, such as a dedicated timestamp unit or device, that generates the second timestamp.

S112: The transmitter device 200 transmits the timestamped message to the receiver device 300. In this respect the transmission may be performed either directly to the receiver device 300 or indirectly (i.e., via at least one intermediate device, node, or unit) to the receiver device 300 using multicast or unicast transmission.

There are different examples of PTP messages which the protected representation of the first timestamp could be inserted. For example, the PTP message could be an IEEE 1588v1 PTP message, or an IEEE 1588v2 PTP message. In more detail, the PTP messages may within the scope of PTP be event messages or general messages. Examples of event messages are Sync, Delay_Req, Pdelay_Req and Pdelay_resp. Examples of general messages are Announce, Follow_Up, Delay_Resp, Pdelay_Resp_Follow_up, Management and Signalling messages.

With reference to the above-referenced OSI model for protocol layers, the second timestamp could be inserted in the message at protocol layer 1 (L1).

Embodiments relating to further details of transmitting protected timestamp information as performed by the transmitter device 200 will now be disclosed.

Reference is now made to FIG. 4 illustrating methods for transmitting protected timestamp information as performed by the transmitter device 200 according to further embodiments. It is assumed that steps S104, S106, S110, and S112 are performed as disclosed above with reference to FIG. 3 and a thus repeated description thereof is therefore omitted.

In some aspects the transmitter device 200 receives feedback information regarding how much in time the second timestamp differs from the first timestamp. This feedback information can then by the transmitter device be used to adjust the representation of the first timestamp in a next message to be transmitted to the receiver device 200. Hence, according to an embodiment the transmitter device 200 is configured to perform step S102:

S102: The transmitter device 200 obtains a time difference between a previous second timestamp of a previous timestamped message and a previous first timestamp of the previous timestamped message. The representation of the first timestamp is then adjusted based on the time difference. The representation of the first timestamp could be adjusted such that the expected time difference is minimized.

Step S102 could be performed prior to above-disclosed step S104.

Such feedback information can be used by the transmitter device 200 to predict the next second timestamp. Such a prediction could thus result in the next secure representation of a next first timestamp is closer to the next second timestamp. This information can also be used by the receiver device 300 for example, to adjust a threshold time value and detect tampering attempts of the second timestamp. Properties of this threshold time value and how it is used by the receiver device 300 will be disclosed below In some aspects the transmitter device 200 thus receives such feedback information relating to respective time differences between multiple previous second timestamps and first timestamps. The transmitter device 200 could then be configured to in step S102 adjust the representation of the first timestamp based on multiple time differences. In this respect the transmitter device 200 may perform filtering on the respective time differences such that more recently occurring time differences are weighted differently than less recently occurring time differences.

If the difference in time between the point in time when the protected representation of the first timestamp was inserted in the payload filed of the message and the point in time when the message was timestamped with the second timestamp can be assumed to be deterministic, this enables the receiver device 300 to use a small threshold time value. In some aspects the second timestamp is thus assumed to have a deterministic difference in time to the first timestamp. Hence, according to an embodiment the protected representation of the first timestamp has a fixed time difference to the second timestamp.

If the timestamp is not to be immediately used by the receiver device 300, and if feedback to the transmitter device 200 before protecting the first timestamp is available, a follow-up message with a protected, and correct, timestamp can be provided. This can be used to have a fast time tracking with the (unsecure) second timestamp and detection tampering with the follow-up secured timestamp or a slower time tracking with secured timestamps. In some aspects the message transmitted by the transmitter device 200 thus comprises further timestamp information in the payload field. This further timestamp information is defined by at least one previous second timestamp. Hence, according to an embodiment the payload field further comprises a protected representation of at least one previous second timestamp of a timestamp field of at least one previously transmitted timestamped message. This enables the receiver device 300 to verify the previous second timestamp.

Each of the at least one previous second timestamp could be weighted with a respective weight factor. As an example, previous second timestamps of less recently transmitted messages could have higher weights than previous second timestamps of more recently transmitted messages. This enables the receiver device 300 to adjust the threshold time value according to the weights of the respective timestamps.

If the message is a first transmitted message then no previous second timestamp is available. Hence, in such cases the transmitter device 200 could provide an indication that there is no protected representation of a previous second timestamp in the payload field. Hence, according to an embodiment the timestamped message is transmitted during a transmission interval, and the payload field further comprises an indication that the timestamped message is a first occurring timestamped message of the transmission interval. This indication may be explicit or implicit. An implicit indication may be defined by the payload field supposed to comprise the protected representation of at least one previous second timestamp of a timestamp field of at least one previously transmitted timestamped message is empty. The transmission interval may be defined as corresponding to an entire communications session between the transmitter device 200 and the receiver device 300, or be defined as corresponding to part of such a communications session.

According to some aspects the transmitter device 200 could selectively switch between including and not including the protected representation of the at least one previous second timestamp in the payload field. There could be different mechanism for triggering such selective switching. For example, the selective switching may be triggered by an indication provided by the receiver device. Hence, according to an embodiment the transmitter device 200 is configured to perform steps S108a and S108b:

S108a: The transmitter device 200 obtains an indication from the receiver device 300 to include the protected representation of the at least one previous second timestamp in the payload field.

S108b: The transmitter device 200 obtains an indication from the receiver device 300 to stop including the protected representation of the at least one previous second timestamp in the payload field.

There can be different ways in order to achieve the protected representation of the first timestamp. According to some aspects the content of the payload field is integrity and/or authentication protected. Hence, according to an embodiment the transmitter device 200 is configured to perform step S106a:

S106a: The transmitter device 200 protects the first timestamp to obtain the protected representation of the first timestamp by at least one of integrity protecting and authentication protecting the first timestamp. In some aspects both integrity protecting and authentication protecting are applied to the first timestamp.

Step S106a could be performed as part of above-disclosed step S106.

According to some aspects the content of the payload field is encrypted. Hence, according to an embodiment the transmitter device 200 is configured to perform step S106b:

S106b: The transmitter device 200 protects the first timestamp to obtain the protected representation of the first timestamp by encrypting the first timestamp.

Step S106b could be performed as part of above-disclosed step S106.

Steps S106a and S106b are not mutually exclusive and hence the transmitter device 200 could protect the first timestamp to obtain the protected representation of the first timestamp by integrity protecting, authentication protecting, and encrypting the first timestamp.

As the skilled person understands, there are different ways to provide integrity protection, authentication protection, and encryption. Examples of protecting the first timestamp include, but are not limited to, applying a cryptographic hash function to the first timestamp, subjecting the first timestamp to operations of Internet Protocol Security (IPsec), subjecting the first timestamp to operations of Media Access Control security (MACsec), and applying a keyed-hash message authentication code (HMAC) to the first timestamp. Examples of the latter are HMAC-SHA0, HMAC-SHA1, HMAC-SHA2, HMAC-SHA3 and HMAC-MD5.

With reference to the above-referenced OSI model for protocol layers, protecting the first timestamp could be performed at protocol layer 2 (L2), or protocol layer 3 (L3).

Reference is now made to FIG. 5 illustrating a method for receiving protected timestamp information as performed by the receiver device 300 according to an embodiment.

As disclosed above, the transmitter device 200 in step S112 transmits a timestamped message to the receiver device 300. It is assumed that the receiver device 300 receives this message and thus is configured to perform step S202:

S202: The receiver device 300 receives the timestamped message. The timestamped message is a PTP. The timestamped message comprises a payload field comprising a protected representation of a first timestamp and a timestamp field comprising a second timestamp.

Once having received the timestamped message the receiver device intends to compare the second timestamp to the first timestamp and therefore extracts the first timestamp. Hence the receiver device 300 is configured to perform step S204:

S204: The receiver device 300 extracts the first timestamp from the protected representation. In this respect the extraction depends on how the first timestamp has been protected. As disclosed above, the first timestamp could be protected by at least one of integrity protection, authentication protection, and encryption and hence the extraction would involve the reversal of these operations, where applicable. Hence the extraction could involve integrity verification, authentication verification, and decryption.

The second timestamp could then be compared to the first timestamp. Hence the receiver device 300 is configured to perform step S206a:

S206a: The receiver device 300 accepts the second timestamp as timestamp of the timestamped message only when the second timestamp is distanced at most a threshold time value from the first timestamp. Examples of such threshold time values will be provided below. Examples of operations, or steps, performed by the receiver device 300 when the second timestamp is distanced more than the threshold time value from the first timestamp will be provided below.

That is, the second timestamp (which is transmitted in a protected manner to the receiver device 30 but does not necessarily represent the point in time when the message was transmitted) can by the receiver device 300 be used together with the first timestamp (which is transmitted in an unprotected manner to the receiver device 30 and represents the point in time when the message was transmitted) and the threshold time value to detect and filter tampering attempts of the second timestamp.

Embodiments relating to further details of receiving protected timestamp information as performed by the receiver device 300 will now be disclosed.

Reference is now made to FIG. 6 illustrating methods for receiving protected timestamp information as performed by the receiver device 300 according to further embodiments. It is assumed that steps S202, S204, and S206a are performed as disclosed above with reference to FIG. 5 and a thus repeated description thereof is therefore omitted There could be different types of operations, or steps, performed by the receiver device 300 when the second timestamp is distanced more than the threshold time value from the first timestamp. According to some aspects the receiver device 300 rejects the second timestamp. Hence, according to an embodiment the receiver device 300 is configured to perform step S206b:

S206b: The receiver device 300 rejects the second timestamp as timestamp of the timestamped message when the second timestamp is distanced more than the threshold time value from the first timestamp.

Step S206b can thus be regarded as an alternative to step S206a.

Upon having rejected the second timestamp the receiver device 300 could inform the transmitter device 200 of the rejection, see for example step S210 below.

There may be different ways to determine, or select, the threshold time value. Different embodiments relating thereto will now be described in turn.

According to some aspects the threshold time value corresponds to a time window. Hence, according to an embodiment the threshold time value is non-zero. Such a threshold time value allows the second timestamp to be distanced in time from the first timestamp. One advantage of this embodiment is that it enables quick communication of timestamp information whilst keeping a reasonable level of security and minimizing the impact of a tampering attempt.

The threshold time value could have either a fixed value or a parameter dependent value. For example the threshold time value could depend on a relation between previous first and second timestamps. This could allow the threshold time value to be adjusted, or even minimized. For example, according to an embodiment the threshold time value is dependent on a time difference between a previously received second timestamp and a previously received first timestamp. In this respect the threshold time value could be dependent on respective time differences between multiple previously received second timestamps and multiple previously received first timestamps. The receiver device 300 could then determine the threshold time value by performing filtering on the respective time differences such that more recently occurring time differences are weighted differently than less recently occurring time differences. The receiver device 300 could thus filter the measured delay (as defined by the time differences) over many messages and check the validity of the unsecured (i.e. second) timestamp. In this respect, the receiver device 300 could also apply filtering during usage of the second timestamp, where previously received second timestamps are used to adjust time and measure delay for a current second timestamp. Such an adjustment can be filtered with the weights and the measurement of delay can be filtered with the weights so that the influence of a less secure second timestamp (i.e., a second timestamp associated with a comparatively large delay) is lessened. This would filter out or diminish attempts to tamper with the timestamp. According to a further embodiment the threshold time value corresponds to no difference between the second timestamp and the first timestamp. Such a threshold time value does thus not allow the second timestamp to be distanced in time from the first timestamp and thus requires the second timestamp to match the first timestamp. These embodiments enable quick communication of timestamp information whilst keeping a high level of security, but rely on the ability to provide a deterministic delay between the point in time when the secure representation of the first timestamp is inserted and the point in time when the message is timestamped with the second timestamp.

Further, as disclosed above, according to an embodiment the payload field further comprises a protected representation of at least one previous second timestamp of a timestamp field of at least one previously received timestamped message. According to some aspects the receiver device 300 then adjusts the threshold time value according to the at least one previous second timestamp. Hence, according to an embodiment the receiver device 300 is configured to perform step S208:

S208: The receiver device 300 adjusts the threshold time value based on the protected representation of the at least one previous second timestamp.

If a small window (i.e., a comparatively small threshold time value) is used and a tampering attempt which is within the window is received, a weighted unsecure timestamp usage could ensure that the actual influence of the tampered timestamp is lessened. The follow-up secure timestamp (as defined by the protected representation of at least one previous second timestamp) can then be used to remove the tampered timestamp and the change of time caused by the tampered timestamp is thus minimized.

This embodiment generally enables a slower communication of timestamp information (which can be mitigated to some extent with the usage of the filtering) than the embodiments disclosed above but keeps a high level of protections.

There could be different mechanisms determining whether or not the payload field is to comprises the protected representation of the at least one previous second timestamp of the timestamp field of the at least one previously received timestamped message. According to some aspects the receiver device 300 requests the transmitter device 200 to include the protected representation of at least one previous second timestamp in the payload field when the second timestamp is rejected in step S206b. Hence, according to an embodiment the receiver device 300 is configured to perform step S210 when the second timestamp is rejected:

S210: The receiver device 300 indicates to the transmitter device (200) to include said protected representation of at least one previous second timestamp in the payload field.

Figure 7:
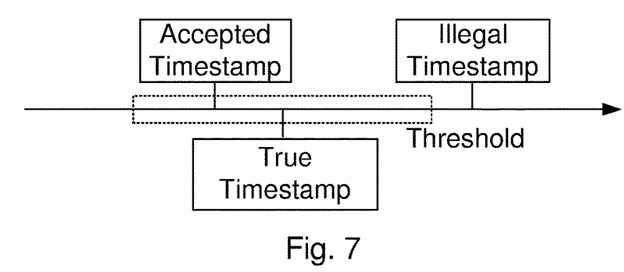
FIGS. 7 and 8 are schematic illustrations of timestamps along a timeline according to embodiments.
Figure 8:
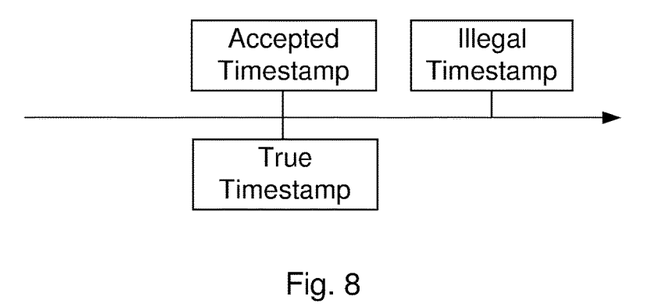

FIGS. 7 and 8 schematically illustrate timestamps along a timeline according to embodiments. In the both FIG. 7 and FIG. 8 a comparison is made to a true timestamp.

The timestamps denoted "accepted timestamp" and "rejected timestamp" represent different values of the second timestamp and the timestamp denoted "true timestamp" represents the true value of the second timestamp which is unknown to the receiver device 300 and by the receiver device 300 represented by the first timestamp.

FIG. 7 represents an embodiment where the timestamp denoted "accepted timestamp" is accepted (as in step S206a) since it is within a window as defined by a distance to the true timestamp by the non-zero threshold time value. Further, the timestamp denoted "rejected timestamp" is rejected (as in step S206b) since it is outside this window.

FIG. 8 represents an embodiment where the timestamp denoted "accepted timestamp" is accepted (as in step S206a) since it is identical to the true timestamp. Further, the timestamp denoted "rejected timestamp" is rejected (as in step S206b) since it is not identical to the true timestamp.

Figure 9:
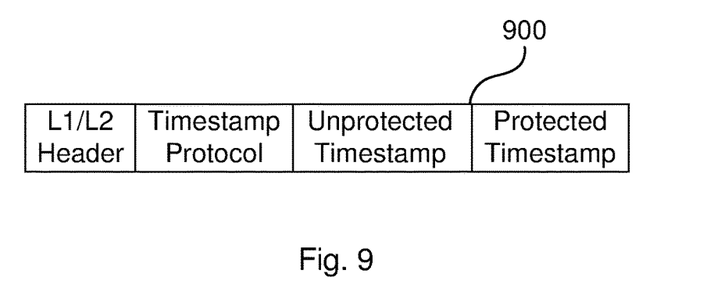
FIGS. 9 and 10 are schematic illustrations of timestamped messages according to embodiments.
Figure 10:
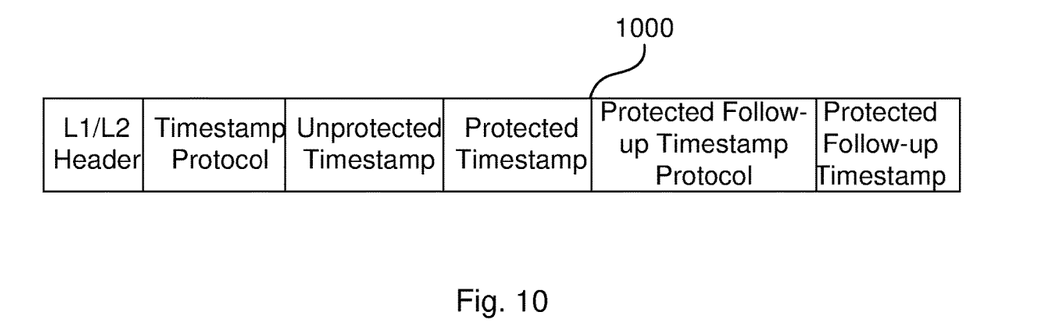

FIGS. 9 and 10 are schematic illustrations of timestamped messages 900, 1000 according to embodiments.

FIG. 9 represents an embodiment where the timestamped message 900 comprises an L1/L2 header and a timestamp protocol part, where the timestamp protocol part in turn comprises a timestamp field comprising an unprotected timestamp (i.e. the second timestamp), and a payload field comprising a protected timestamp (i.e., the protected representation of the first timestamp).

FIG. 10 represents an embodiment where the timestamped message 1000 comprises an L1/L2 header and a timestamp protocol part, where the timestamp protocol part in turn comprises a timestamp field comprising an unprotected timestamp (i.e. the second timestamp), and a payload field comprising a protected timestamp (i.e., the protected representation of the first timestamp) as well as an indication that the messages comprises protected follow-up timestamp protocol information and a protected representation of at least one previous second timestamp (defining the protected follow-up timestamp protocol information).

Figure 11:
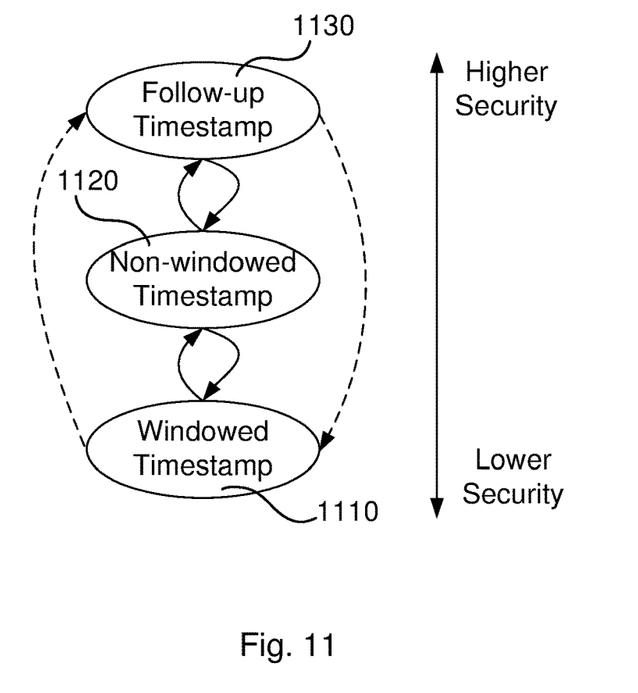
FIG. 11 is a schematic diagram illustrating a finite-state machine with transitions between protection levels according to an embodiment.

Any of the above embodiments relating to where the threshold time value is non-zero, where the threshold time value corresponds to no difference between the second timestamp and the first timestamp, and where the payload field further comprises a protected representation of at least one previous second timestamp of a timestamp field of at least one previously received timestamped message can be readily combined in order to provide escalating levels of protection of the timestamp information. Reference is here made to FIG. 11.

FIG. 11 illustrates a finite-state machine with transitions between protection levels according to an embodiment. The finite-state machine could be implemented by the receiver device 300 and thus enable the receiver device 300 to selectively increase or decrease the level of protection of the timestamp information.

The finite-state machine comprises a first state 1110 denoted "windowed timestamp" enabling lowest security, a second state 1120 denoted "Non-windowed timestamp" enabling middle security, and a third state 1130 denoted "follow-up timestamp" enabling highest security. The first state 1110 corresponds to embodiments where the threshold time value is non-zero. The second state 1120 corresponds to embodiments where the threshold time value corresponds to no difference between the second timestamp and the first timestamp. The third state 1130 corresponds to embodiments where the payload field further comprises a protected representation of at least one previous second timestamp of a timestamp field of at least one previously received timestamped message.

Transitions between the states 1110, 1120, 1130 are marked by arrows. Transition from state 1110 to state 1120 could be triggered by the receiver device 300 detecting tampering attempts, for example that the second timestamp is distanced more than the threshold time value from the first timestamp. Transition from state 1120 to state 1130 could be triggered by the receiver device 300 detecting further tampering attempts, for example that that the second timestamp does not match the first timestamp. In the same way, the lack of detected tampering attempts (or at least when detecting tampering attempts less often than detection threshold values; one high detection threshold value for step S1130 and one low detection threshold value for step S1120) can be used by the receiver device 300 to decrease the level of protection on the timestamp and hence transition from state 1130 to state 1120 and from state 1120 to state 1110.

Advantageously, by enabling escalating protection of the timestamp information the protection of the timestamp information could adapt the proofing against tampering attempts to the tampering level perceived.

In some embodiments the fine-state machine comprises only two of the states 1110, 1120, 1130 and hence state transitions are only present for state transitions between the thus two states present in the fine-state machine.

Figure 12:
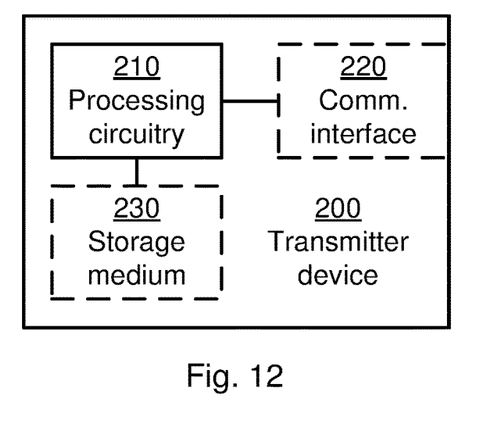
FIG. 12 is a schematic diagram showing functional units of a transmitter device according to an embodiment.

FIG. 12 schematically illustrates, in terms of a number of functional units, the components of a transmitter device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the transmitter device 200 to perform a set of operations, or steps, S102-S112, as disclosed above. For example, the storage medium 230 may store the set of operations, and the processing circuitry 210 may be configured to retrieve the set of operations from the storage medium 230 to cause the transmitter device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The transmitter device 200 may further comprise a communications interface 220 for communications with the receiver device 300. As such the communications interface 220 may comprise one or more transmitters and receivers, comprising analogue and digital components and a suitable number of antennas for wireless communications and/or ports for wireline communications.

For example, the processing circuitry 210 could implement the functionality of modules 250, 260 of FIG. 2, the communications interface 220 could implement the functionality of module 270 of FIG. 2, and the storage medium 230 could implement the functionality of module 240 of FIG. 2.

The processing circuitry 210 controls the general operation of the transmitter device 200 e.g. by sending data and control signals to the communications interface 220 and the storage medium 230, by receiving data and reports from the communications interface 220, and by retrieving data and instructions from the storage medium 230. Other components, as well as the related functionality, of the transmitter device 200 are omitted in order not to obscure the concepts presented herein.

Figure 13:
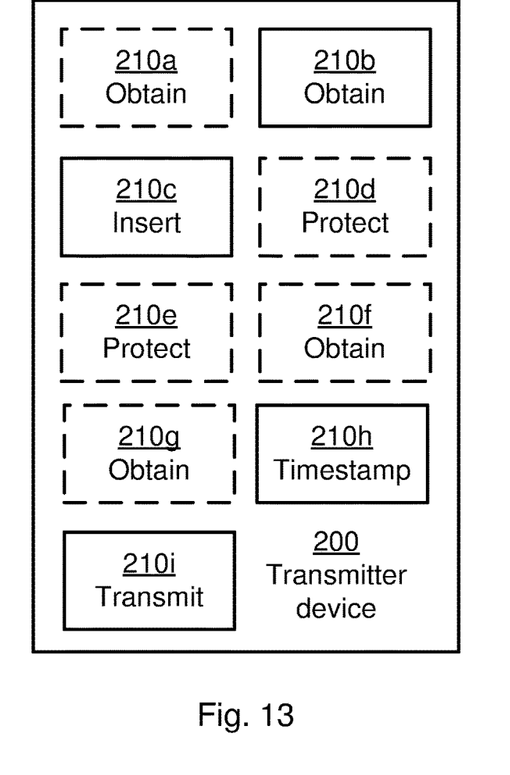
FIG. 13 is a schematic diagram showing functional modules of a transmitter device according to an embodiment.

FIG. 13 schematically illustrates, in terms of a number of functional modules, the components of a transmitter device 200 according to an embodiment. The transmitter device 200 of FIG. 13 comprises a number of functional modules; an obtain module 210b configured to perform step S104, an insert module 210c configured to perform step S106, a timestamp module 210h configured to perform step S110, and a transmit module 210i configured to perform step S112. The transmitter device 200 of FIG. 13 may further comprise a number of optional functional modules, such as any of an obtain module 210a configured to perform step S102, a protect module 210d configured to perform step S106a, a protect module 210e configured to perform step S106b, an obtain module 210f configured to perform step S108a, and an obtain module 210g configured to perform step S108b.

In general terms, each functional module 210a-210i may be implemented in hardware or in software. In general terms, each functional module 210a-210i may in one embodiment be implemented only in hardware, such as in an ASIC comprised in an eNodeB communications device, or and in another embodiment with the help of software, i.e., the latter embodiment having computer program instructions stored on the storage medium 230 which when run on the processing circuitry makes the transmitter device 200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with functional units 220 and/or 230. The processing circuitry 210 may thus be arranged to from the storage medium 230 fetch instructions as provided by a functional module 210a-210i and to execute these instructions, thereby performing any steps of the transmitter device 200 as disclosed herein.

Figure 14:
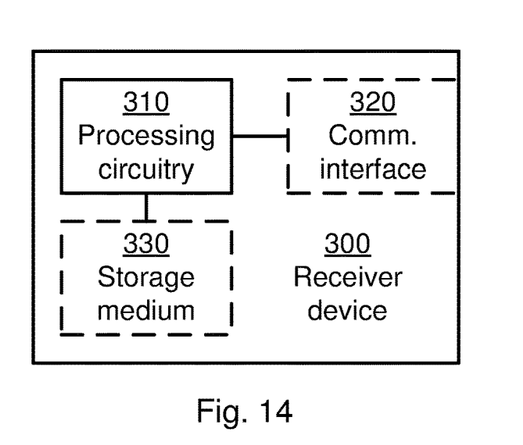
FIG. 14 is a schematic diagram showing functional units of a receiver device according to an embodiment.

FIG. 14 schematically illustrates, in terms of a number of functional units, the components of a receiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the receiver device 300 to perform a set of operations, or steps, S202-S210, as disclosed above. For example, the storage medium 330 may store the set of operations, and the processing circuitry 310 may be configured to retrieve the set of operations from the storage medium 330 to cause the receiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The receiver device 300 may further comprise a communications interface 320 for communications at least with the transmitter device 200. As such the communications interface 320 may comprise one or more transmitters and receivers, comprising analogue and digital components and a suitable number of antennas for wireless communications and ports for wireline communications.

For example, the processing circuitry 310 could implement the functionality of modules 350, 360 of FIG. 2, the communications interface 320 could implement the functionality of module 340 of FIG. 2, and the storage medium 330 could implement the functionality of module 370 of FIG. 2.

The processing circuitry 310 controls the general operation of the receiver device 300 e.g. by sending data and control signals to the communications interface 320 and the storage medium 330, by receiving data and reports from the communications interface 320, and by retrieving data and instructions from the storage medium 330. Other components, as well as the related functionality, of the receiver device 300 are omitted in order not to obscure the concepts presented herein.

Figure 15:
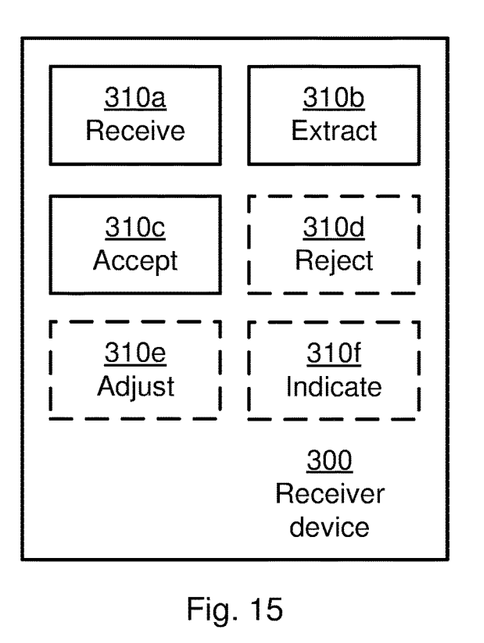
FIG. 15 is a schematic diagram showing functional modules of a receiver device according to an embodiment.

FIG. 15 schematically illustrates, in terms of a number of functional modules, the components of a receiver device 300 according to an embodiment. The receiver device 300 of FIG. 15 comprises a number of functional modules; a receive module 310a configured to perform step S202, an extract module 310b configured to perform step S204, and an accept module 310c configured to perform step S206a. The receiver device 300 of FIG. 15 may further comprises a number of optional functional modules, such as any of a reject module 310d configured to perform step S206b, and adjust module 310e configured to perform step S208, and an indicate module 310f configured to perform step S210. In general terms, each functional module 310a-310f may be implemented in hardware or in software. In general terms, each functional module 310a-310f may in one embodiment be implemented only in hardware or and in another embodiment with the help of software, i.e., the latter embodiment having computer program instructions stored on the storage medium 330 which when run on the processing circuitry makes the receiver device 300 perform the corresponding steps mentioned above in conjunction with FIG. 15. It should also be mentioned that even though the modules correspond to parts of a computer program, they do not need to be separate modules therein, but the way in which they are implemented in software is dependent on the programming language used. Preferably, one or more or all functional modules 310a-310f may be implemented by the processing circuitry 310, possibly in cooperation with functional units 320 and/or 330. The processing circuitry 310 may thus be arranged to from the storage medium 330 fetch instructions as provided by a functional module 310a-310f and to execute these instructions, thereby performing any steps of the receiver device 300 as disclosed herein.

The transmitter device 200 and/or receiver device 300 may be provided as a standalone device or as a part of at least one further device. For example, the transmitter device 200/receiver device 300 may be provided in the communications device 110, 120. Alternatively, functionality of the transmitter device 200 may be distributed between at least two devices, or nodes. These at least two nodes, or devices, may either be part of the same network part (such as radio access network, or the core network, or service network) or may be spread between at least two such network parts.

Thus, a first portion of the instructions performed by the transmitter device 200 and/or receiver device 300 may be executed in a first device, and a second portion of the of the instructions performed by the transmitter device 200 and/or receiver device 300 may be executed in a second device; the herein disclosed embodiments are not limited to any particular number of devices on which the instructions performed by the transmitter device 200 and/or receiver device 300 may be executed. Hence, the methods according to the herein disclosed embodiments are suitable to be performed by a transmitter device 200 and/or receiver device 300 residing in a cloud computational environment. Therefore, although a single processing circuitry 210, 310 is illustrated in FIGS. 12 and 14 the processing circuitry 210, 310 may be distributed among a plurality of devices, or nodes. The same applies to the functional modules 210a-210i, 310a-310f of FIGS. 13 and 15 and the computer programs 1620a, 1620b of FIG. 16 (see below).

Figure 16:
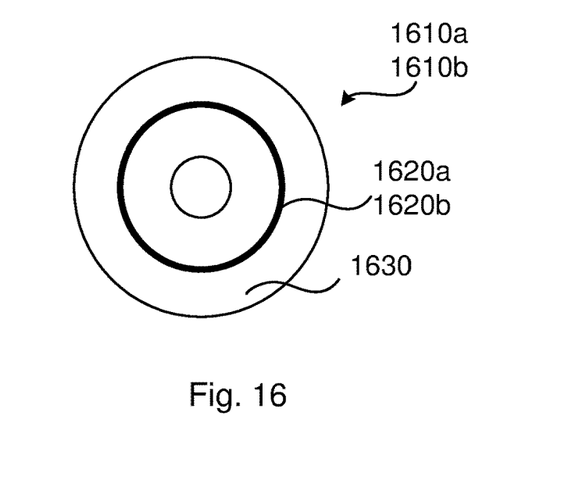
FIG. 16 shows one example of a computer program product comprising computer readable means according to an embodiment.

FIG. 16 shows one example of a computer program product 1610a, 1610b comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the transmitter device 200 as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the receiver device 300 as herein disclosed.

In the example of FIG. 16, the computer program product 1610a, 1610b is illustrated as an optical disc, such as a CD (compact disc) or a DVD (digital versatile disc) or a Blu-Ray disc. The computer program product 1610a, 1610b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b is here schematically shown as a track on the depicted optical disk, the computer program 1620a, 1620b can be stored in any way which is suitable for the computer program product 1610a, 1610b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of timestamp information, the method being performed by a transmitter device, the method comprising:
   obtaining a first timestamp;
   inserting a protected representation of the first timestamp in a field of a payload of a precision time protocol (PTP) message;
   producing a timestamped PTP message that comprises both the protected representation of the first timestamp and a second timestamp by inserting the second timestamp in a timestamp field of the payload of the PTP message comprising the protected representation of the first timestamp; and
   transmitting the timestamped PTP message to a receiver device.

2. The method of claim 1, further comprising:
   obtaining a time difference between a previous second timestamp of a previous timestamped message and a previous first timestamp of the previous timestamped message, wherein the representation of the first timestamp is adjusted based on the time difference.

3. The method of claim 1, wherein the protected representation of the first timestamp has a fixed time difference with respect to the second timestamp.

4. The method of claim 1, wherein the payload further comprises a protected representation of at least one previous timestamp of a timestamp field of at least one previously transmitted timestamped message.

5. The method of claim 1, wherein the timestamped PTP message is transmitted during a transmission interval, and wherein the payload further comprises an indication that the timestamped PTP message is a first occurring timestamped message of the transmission interval.

6. The method of claim 1, further comprising:
   protecting the first timestamp to obtain the protected representation of the first timestamp by at least one of integrity protecting and authentication protecting the first timestamp.

7. The method of claim 1, further comprising:
   protecting the first timestamp to obtain the protected representation of the first timestamp by encrypting the first timestamp.

8. The method of claim 6, wherein protecting the first timestamp comprises at least one of applying a cryptographic hash function to the first timestamp, subjecting the first timestamp to operations of Internet Protocol Security, IPsec, subjecting the first timestamp to operations of Media Access Control security, MACsec, and applying a keyed-hash message authentication code to the first timestamp.

9. The method of claim 1, wherein the second timestamp is inserted in the message at protocol layer 1.

10. A method for reception of timestamp information, the method being performed by a receiver device, the method comprising:
- receiving a timestamped message, wherein the timestamped message is a precision time protocol (PTP) message and comprises a payload field comprising a protected representation of a first timestamp and a timestamp field comprising a second timestamp;
- extracting the first timestamp from the protected representation;
- comparing the first timestamp with the second timestamp;
- based on the comparing, determining whether the second timestamp is distanced at most a threshold time value from the first timestamp; and
- deciding whether to accept or reject the second timestamp as timestamp of the timestamped message based on the determination as to whether the second timestamp is distanced at most a threshold time value from the first timestamp.

11. The method of claim 10, wherein the threshold time value is non-zero.

12. The method of claim 10, wherein the threshold time value is dependent on a time difference between a previously received second timestamp and a previously received first timestamp.

13. The method of claim 10, wherein the threshold time value corresponds to no difference between the second timestamp and the first timestamp.

14. The method of claim 10, wherein the payload field further comprises a protected representation of at least one previous second timestamp of a timestamp field of at least one previously received timestamped message.

15. The method of claim 10, further comprising:
- rejecting the second timestamp as timestamp of the timestamped message when the second timestamp is distanced more than the threshold time value from the first timestamp.

16. A transmitter device for transmission of timestamp information, the transmitter device comprising processing circuitry, the processing circuitry being configured to cause the transmitter device to:
- obtain a first timestamp;
- insert a protected representation of the first timestamp in a field of a payload of a precision time protocol (PTP) message;
- produce a timestamped PTP message that comprises both the protected representation of the first timestamp and a second timestamp by inserting the second timestamp in a timestamp field of the payload of the PTP message comprising the protected representation of the first timestamp; and
- transmit the timestamped PTP message to a receiver device.

17. A receiver device for reception of timestamp information, the receiver device comprising processing circuitry, the processing circuitry being configured to cause the receiver device to:
- receive a timestamped message, wherein the timestamped message is a precision time protocol (PTP) message and comprises a payload field comprising a protected representation of a first timestamp and a timestamp field comprising a second timestamp;
- extract the first timestamp from the protected representation;
- compare the first timestamp with the second timestamp;
- based on the comparing, determine whether the second timestamp is distanced at most a threshold time value from the first timestamp; and
- decide whether to accept or reject the second timestamp as timestamp of the timestamped message based on the determination as to whether the second timestamp is distanced at most a threshold time value from the first timestamp.

* * * * *